United States Patent
Wyatt et al.

(10) Patent No.: US 8,373,707 B1
(45) Date of Patent: Feb. 12, 2013

(54) SYSTEM AND METHOD FOR SELECTING THE BOOT VGA ADAPTER IN A MULTI-GRAPHICS PROCESSING UNIT COMPUTING SYSTEM

(75) Inventors: David Wyatt, San Jose, CA (US); Hon Fei Chong, Campbell, CA (US); Yu Qing Cheng, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1363 days.

(21) Appl. No.: 12/053,115

(22) Filed: Mar. 21, 2008

(51) Int. Cl.
*G06F 15/16* (2006.01)
*G06F 15/00* (2006.01)
*G06T 1/00* (2006.01)

(52) U.S. Cl. ........................ 345/502; 345/501
(58) Field of Classification Search .................. 345/501, 345/502, 504, 505
See application file for complete search history.

(56) References Cited

U.S. PATENT DOCUMENTS

| | | | |
|---|---|---|---|
| 6,304,244 B1 * | 10/2001 | Hawkins et al. | 345/502 |
| 2005/0243095 A1 * | 11/2005 | Wu et al. | 345/520 |
| 2006/0119603 A1 * | 6/2006 | Chen et al. | 345/502 |
| 2007/0076006 A1 * | 4/2007 | Knepper et al. | 345/520 |
| 2008/0034238 A1 * | 2/2008 | Hendry et al. | 713/323 |

* cited by examiner

*Primary Examiner* — Jacinta M Crawford
(74) *Attorney, Agent, or Firm* — Patterson & Sheridan, LLP

(57) ABSTRACT

One embodiment of the present invention sets forth a technique for selecting a boot VGA adapter in a multiple VGA adapter system by controlling the system boot process using the VBIOS display detection service and boot flags that are stored in non-volatile platform memory. The SBIOS initiates a first boot that selects the motherboard integrated graphics processing unit (MGPU) as the boot VGA adapter. During this first boot, if the SBIOS determines that there are display devices attached to the MGPU, then the first boot completes normally. Otherwise, the SBIOS aborts the first boot and initiates a second boot that selects a secondary, discrete graphics processing unit GPU (DGPU) as the boot VGA adapter. During this second boot, if the SBIOS determines that there are display devices attached to the DGPU, then the second boot completes normally. Otherwise, the SBIOS aborts the second boot, and initiates and completes a third system boot that selects the MGPU as the boot VGA adapter while setting flags to ensure that the overall process does not repeat.

20 Claims, 5 Drawing Sheets

SYSTEM AND METHOD FOR SELECTING THE BOOT VGA ADAPTER IN A MULTI-GRAPHICS PROCESSING UNIT COMPUTING SYSTEM

BACKGROUND OF THE INVENTION

1. Field of the Invention

The present invention relates generally to the field of graphics processing and more specifically to a system and method for selecting the boot VGA adapter in a multi-graphics processing unit computing system.

2. Description of the Related Art

A typical computing system includes a central processing unit (CPU), an input device, a system memory, one or more graphics processing units (GPUs), and any number of display devices. A variety of software application programs may run on the computing system. The CPU usually executes the overall structure of the software application program and configures the GPUs to perform specific tasks in the graphics pipeline. Some computing systems include both a power-saving motherboard integrated GPU (MGPU) and one or more higher-performance discrete GPUs (DGPU). Such a computing system may support a variety of hybrid features. For example, in a hybrid power mode, the CPU may minimize power consumption by powering-down the DGPU and using only the MGPU.

Each GPU has the ability to receive data and to use this data to drive one or more attached display devices. However, one of the GPUs in the computing system is configured as a boot VGA adapter, and the remaining GPUS are configured as secondary, non-VGA adapters. This is due to the fact that, by definition, the standard VGA device uses certain fixed legacy I/O and memory resources which cannot be moved or shifted to support additional VGA adapters that occupy the same I/O and memory locations. The GPU that is configured as the boot VGA adapter is the only GPU that receives critical diagnostic information and error messages, such as power-on self-test (POST) boot screens, operating system boot messages, and failsafe error messages. When the computing system is booted-up, the system basic input/output system (SBIOS) selects the boot VGA adapter and, typically, this VGA adapter selection cannot be altered until the computing system is rebooted. Further, the computing system will not usually allow the boot VGA adapter to be powered-down while the computing system is running.

In one approach to selecting the boot VGA adapter, the SBIOS selects the MGPU as the boot VGA adapter by default. Selecting the MGPU as the boot VGA adapter in this fashion allows the computing system to power down the DGPU to support certain hybrid features. One drawback to this approach, however, is that there may be no display device attached to the MGPU. To the extent there is no display device attached to the MGPU, when the computing system boots, data targeted to only the boot VGA adapter is not displayed. Such a situation might occur if the user accidentally attaches the only display device to the DGPU. Alternatively, the user may purposefully attach the only display device to the DGPU to take advantage of a feature of the DGPU, such as a high-definition multimedia interface (HDMI), which is not always supported by the MGPU. In such a situation, the computing system is unable to display certain critical information until the user either attaches a display device to the MGPU or reboots the system and manually selects the DGPU as the boot VGA adapter.

As the foregoing illustrates, what is needed in the art is a more flexible and effective technique for selecting the boot VGA adapter in a multi-GPU computing system.

SUMMARY OF THE INVENTION

One embodiment of the present invention sets forth a method for selecting one of a plurality of processing units as a boot VGA adapter. The method includes the steps of initiating a first system boot, reading a control flag stored in a non-volatile memory to determine which processing unit should be tested as the boot VGA adapter, selecting a first processing unit to query based on the control flag, and querying a video basic input/output system (VBIOS) associated with the first processing unit to determine whether there are any display devices attached to the first processing unit.

One advantage of the disclosed method is that, if there are any display devices attached to the computing system, then the SBIOS automatically selects the GPU that is attached to one of the display devices as the boot VGA adapter. Consequently, the computing system is always able to determine the adapter with a display device on which critical data that is only available to the boot VGA adapter can be displayed without any manual intervention from the user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
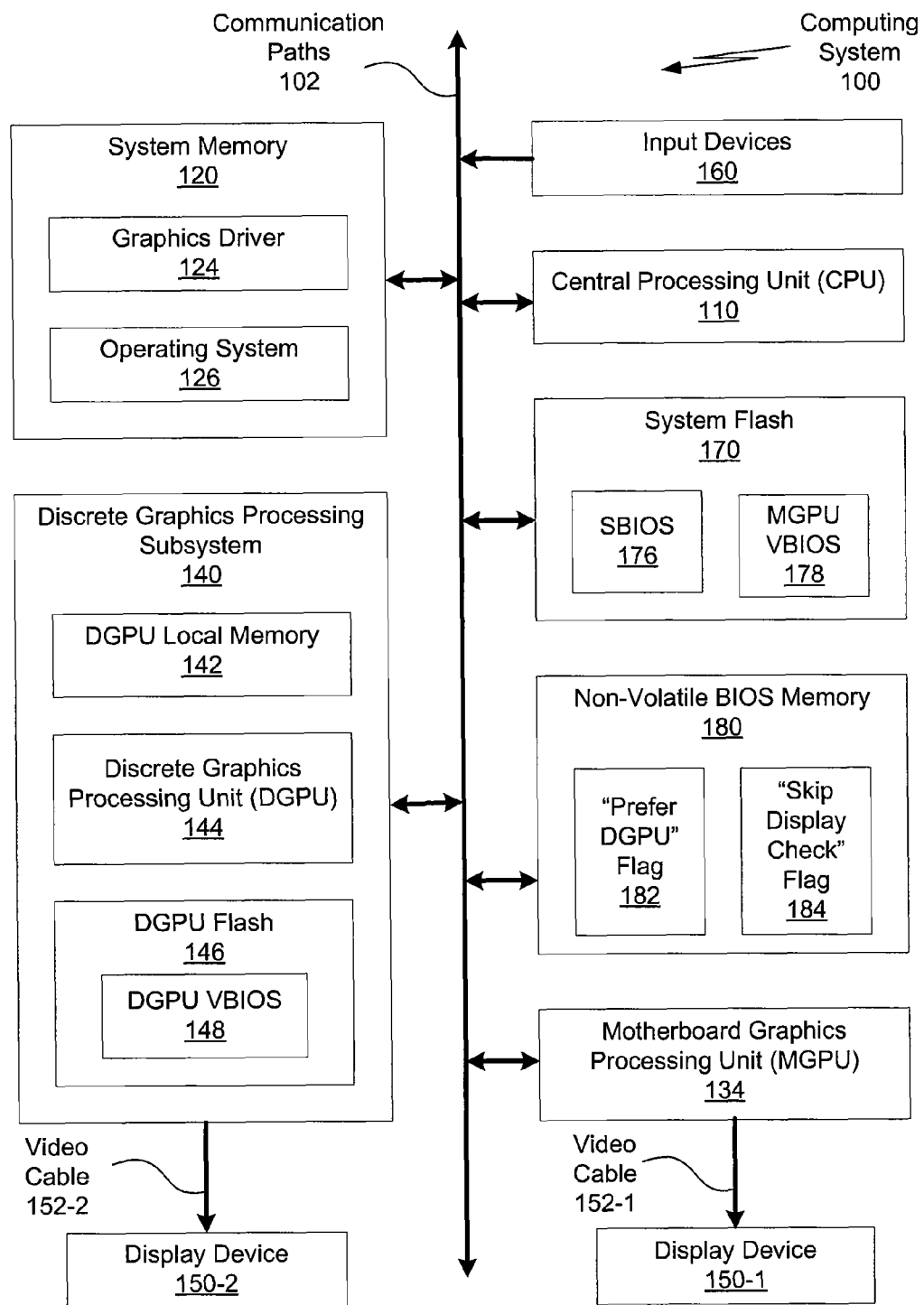
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a central processing unit (CPU) 110, input devices 160, a system memory 120, a system flash 170, a non-volatile basic input/output system (BIOS) memory 180, a motherboard integrated graphics processing unit (MGPU) 134, a discrete graphics processing subsystem 140, any number of video cables 152, and any number of display devices 150. In other embodiments, the computing system may include any number of CPUs and any number of discrete graphics processing subsystems. Communication paths 102 interconnecting the various components in FIG. 1 may be implemented using any suitable bus or point-to-point communication protocol(s), and connections between different devices may use different protocols as is known in the art.

The CPU 110 receives user input from the input devices 160, executes programming instructions stored in the system flash 170 and the system memory 120, and operates on data stored in the non-volatile BIOS memory 180 and the system memory 120. Further, the CPU 110 may tune the performance and power consumption of the computing system 100 by configuring either the MGPU 134 or the discrete graphics processing subsystem 140 to perform specific tasks in the graphics pipeline. When the CPU 110 is not using the discrete graphics processing subsystem 140, the CPU 110 may power down the discrete graphics processing subsystem 140 to reduce the power consumption of the computing system 100. In other embodiments, the CPU 110 may configure the MGPU 134 and the discrete graphics processing subsystem 140 to work together.

The system flash 170 includes non-volatile memory, such as flash, erasable programmable read-only memory (EPROM), or the like, used to store instructions that are designed to be retained when the computing system 100 is powered-down. The system flash 170 includes a system basic input/output system (SBIOS) 176 and a MGPU video basic input/output system (VBIOS) 178. In alternate embodiments, the system flash may also include one or more DGPU VBIOS(s). Among other things, the SBIOS 176 initializes the computing system 100 during the system boot process. As part of the system boot process, the SBIOS 176 selects the boot VGA adapter and enables, tests, and configures various components in the computing system 100, such as the system memory 120 and the GPU associated with the selected boot VGA adapter. The process of initializing the computer system 100 is referred to as a system power-on self-test (POST). Similarly, the process of initializing a GPU during a system POST is referred to as a VBIOS POST.

The final step that the SBIOS 176 performs during a system POST is to load an operating system 126 into the system memory 120 and, subsequently, transfer master control of the computing system 100 to the operating system 126. After the boot process is complete, the SBIOS 176 may be used by programs (e.g., the operating system 126) to access various hardware components in the computing system 100.

The MGPU VBIOS 178 contains code that is used to enable, test, configure, and access the MGPU 134. Among other things, the MGPU VBIOS 178 provides a VBIOS display detection service. When the MGPU VBIOS 178 initializes the MGPU 134 by executing a VBIOS POST, the MGPU VBIOS 178 determines the number and capabilities of any display devices that are attached to the MGPU 134. Subsequently, other programs (e.g., the SBIOS 176) may access this information through the MGPU VBIOS 178.

The system memory 120 typically includes dynamic random access memory (DRAM) used to store programming instructions and data for processing by the CPU 110, the MGPU 134, and the discrete graphics processing subsystem 140. As shown, the system memory 120 includes the operating system 126 and a graphics driver 124. The graphics driver 124 is configured to receive instructions from application programs and translate the instructions into machine code programs that execute on the MGPU 134 and components within the discrete graphics processing subsystem 140.

The MGPU 134 receives instructions transmitted from the MGPU VBIOS 178 and the graphics driver 124, processes the instructions in order to render graphics images, and stores these images in the system memory 120. Subsequently, the MGPU 134 may convey rendered graphics images through the video cable 152-1 to the display device 150-1. The MGPU 134 may be attached to more or less than one display device 150. In one embodiment, the MGPU 134 is part of the main chipset that is wired into the motherboard of the computing system 100. In alternative embodiments the MGPU may be provided with a local memory.

The discrete graphics processing subsystem 140 includes a DGPU flash 146, a discrete graphics processing unit (DGPU) 144, and a DGPU local memory 142. The discrete graphics processing subsystem 140 may be part of a discrete graphics card that is connected to the motherboard of the computing system 100 via an expansion slot (e.g., PCI Express or Accelerated Graphics Port). In other embodiments, the discrete graphics processing subsystem may include more than one DGPU.

The DGPU flash 146 typically includes non-volatile memory used to store instructions that are designed to be retained when the discrete graphics processing subsystem 140 is powered-down. The DGPU flash 146 includes a DGPU VBIOS 148 that is used to enable, test, configure, and access the discrete graphics processing subsystem 140. Among other things, the DGPU VBIOS 148 provides a VBIOS display detection service. When the DGPU VBIOS 148 initializes the DGPU 144 by executing a VBIOS POST, the DGPU VBIOS 148 determines the number and capabilities of any display devices that are attached to the DGPU 144. Subsequently, other programs may access this information through the DGPU VBIOS 148. In alternate embodiments, the discrete graphics processing subsystem may not include a DGPU flash and the DGPU VBIOS may be incorporated into the system flash.

The DGPU 144 receives instructions transmitted from the DGPU VBIOS 148 and the graphics driver 124, processes the instructions in order to render graphics images, and stores these images in the DGPU local memory 142. Subsequently, the DGPU 144 may convey rendered graphics images through the video cable 152-2 to the display device 150-2. The DGPU 144 may be attached to more or less than one display device 150.

The non-volatile BIOS memory 180 is used to store instructions and data, such as BIOS settings, that are used by the SBIOS 176 when the computing system 100 is rebooted. The data in the non-volatile BIOS memory 180 may be accessed and modified by various programs, such as the SBIOS 176. As shown, the non-volatile BIOS memory 180 includes a "prefer DGPU" flag 182 and a "skip display check" flag 184. Both the "prefer DGPU flag" 182 and the "skip display check" flag 184 are initially cleared (i.e., set to false). Further, if the non-volatile BIOS memory 180 is reset, then the flags 182 and 184 are cleared.

Figure 2:
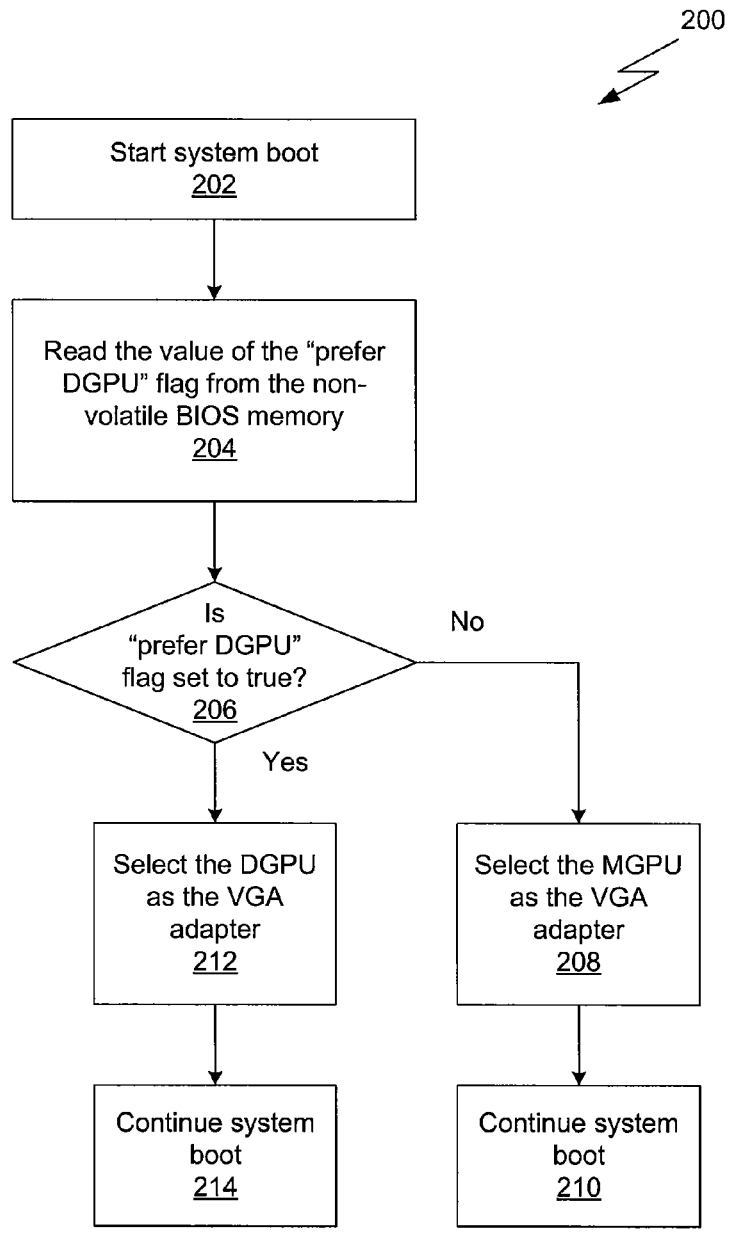
FIG. 2 is a flow diagram of method steps for initiating a system boot, according to one embodiment of the invention.
Figure 3:
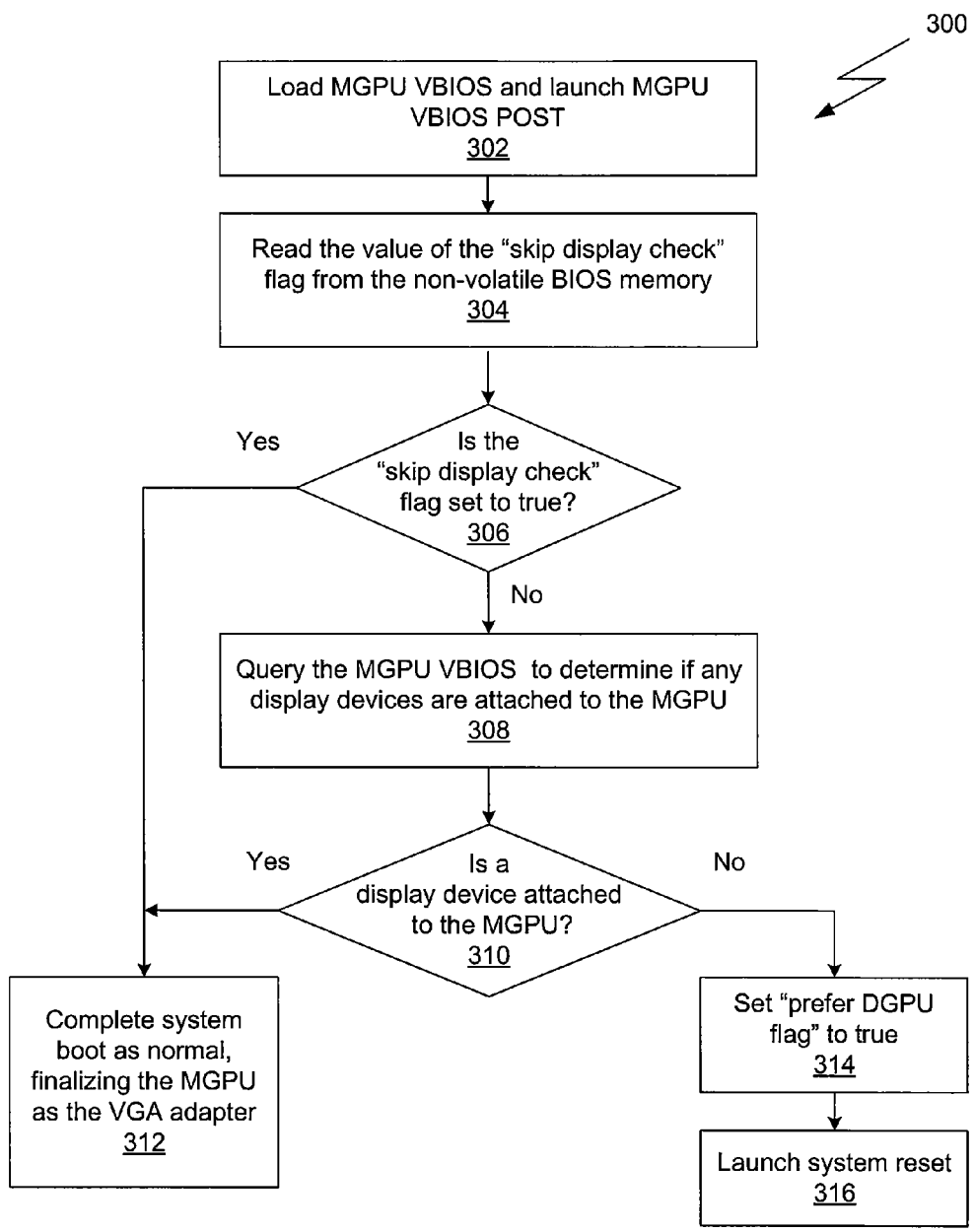
FIG. 3 is a flow diagram of method steps for continuing a system boot after selecting the MGPU as the boot VGA adapter, according to one embodiment of the invention.
Figure 4:
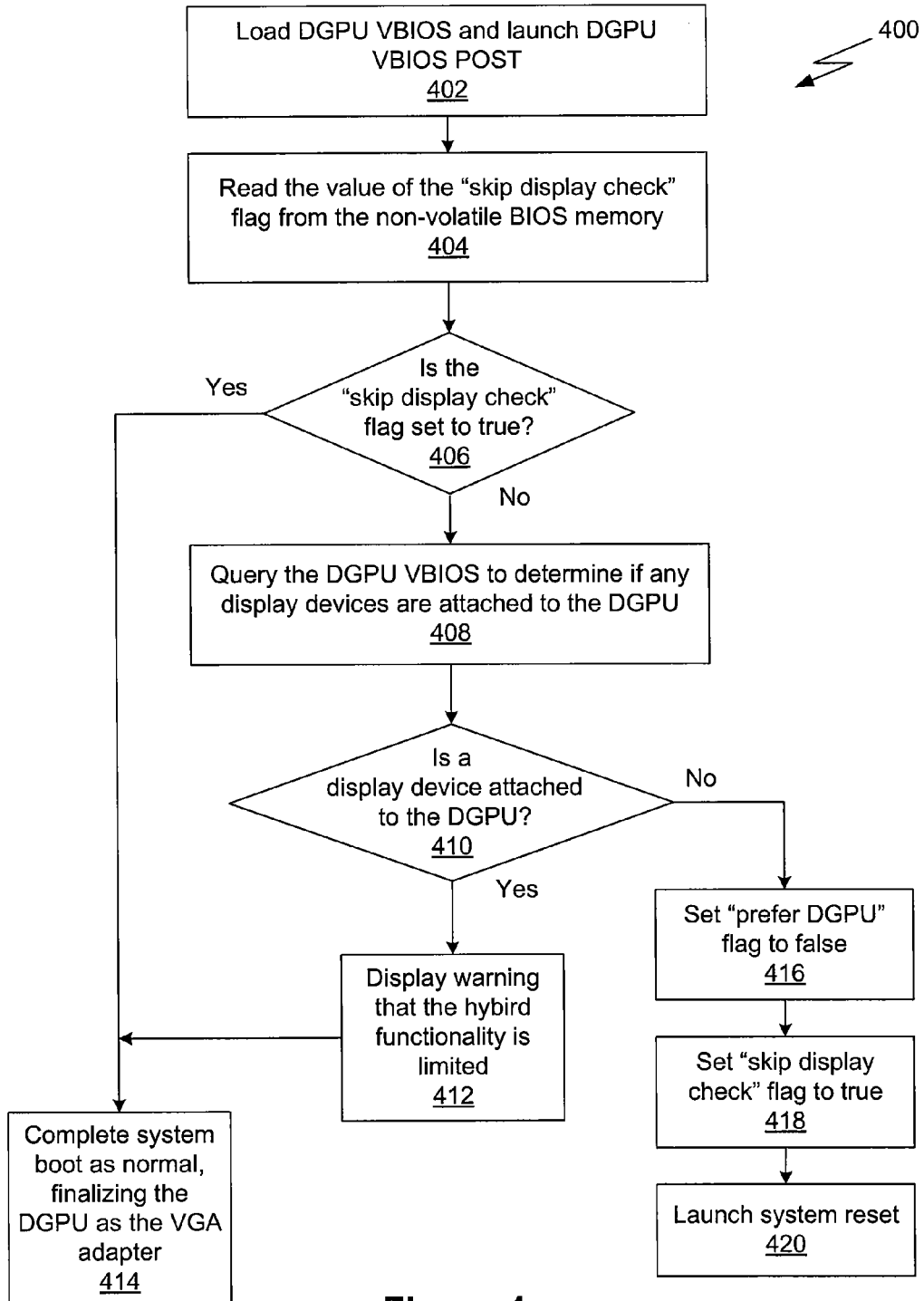
FIG. 4 is a flow diagram of method steps for continuing a system boot after selecting the DGPU as the boot VGA adapter, according to one embodiment of the invention.

As described in greater detail in FIGS. 2-4, the SBIOS 176 is configured to tailor the system boot process based on the value of the "prefer DGPU" flag 182, the value of the "skip display check" flag 184, and the number of display devices that are attached to the MGPU 134 and the DGPU 144. The SBIOS 176 selects one of the GPUs 134 or 144 as the boot VGA adapter based on the value of the "prefer DGPU" flag 182, loads the VBIOS associated with the boot VGA adapter, and launches a VBIOS POST. After the VBIOS POST is complete, if the "skip display check" flag 184 is set to false, then the SBIOS 176 queries the VBIOS associated with the boot VGA adapter to determine if there are any display devices attached to the boot VGA adapter. If there are no display devices attached to the boot VGA adapter, then the SBIOS 176 sets the "prefer DGPU" flag 182 and/or the "skip display check" flag 184 to different values. The SBIOS 176 then aborts the system boot and launches a system reset, consequently initiating a new system boot. However, if there is a display device 150 attached to the boot VGA adapter or if the "skip display check" flag 184 is set to true, then the SBIOS 176 completes the system boot process, thereby finalizing the selection of the boot VGA adapter.

Advantageously, the "prefer DGPU" flag 182, the "skip display check" flag 184 and the VBIOS display detection service enable the SBIOS 176 to orchestrate a sequence of events as part of the default system boot that result in the SBIOS 176 selecting the optimal boot VGA adapter. A series of method steps for executing the default system boot is described in greater detail below in conjunction with FIG. 5.

In alternate embodiments, the computing system may include more than one DGPU, and the "prefer DGPU" flag may be replaced by a "preferred GPU" option. The "preferred GPU" option may include one or more bits that, together, specify a particular GPU. The SBIOS functionality may be extended to use the "preferred GPU" option to cycle through the GPUs, as necessary, during the system boot process. More specifically, as part of the system boot, if the "display device check" flag is set to true and there are no display devices attached to the GPU specified by the "preferred GPU" option, then the SBIOS may change the "preferred GPU" option to specify the next GPU in a pre-determined sequence, and execute a system reset.

As is known by persons skilled in the art, there are additional mechanisms that control the system boot process. Further, these control mechanisms may potentially enable, disable, or alter the "prefer DGPU" flag 182 and the "skip display check" flag 184. For example, immediately prior to entering a hibernate mode, the computing system saves a memory image to disk. As part of the reboot process that occurs when returning from the hibernate mode, the SBIOS is typically configured to restore the memory image. To expedite the reboot process, the graphics driver may call the SBIOS to set the "skip display check" flag to true before the computing system saves the memory image to disk and enters the hibernate mode. Similarly, in alternate embodiments, the SBIOS may be configured to read a "hybrid disable" boot setup option that has precedence over the "prefer GPU" flag and the "skip display check" flag. When the "hybrid disable" boot setup option is set to true, the SBIOS may force the selection of the DGPU as the boot VGA adapter by setting both the "prefer DGPU" flag and the "skip display check" flag to true.

FIG. 2 is a flow diagram of method steps for initiating a system boot, according to one embodiment of the invention. Although the method steps are described in conjunction with the system for FIG. 1, persons skilled in the art will understand that any system that performs the method steps, in any order, is within the scope of the invention.

As shown, the method 200 begins at step 202, where the SBIOS 176 starts a system boot process. At step 204, the SBIOS 176 reads the value of the "prefer DGPU" flag 182 from the non-volatile BIOS memory 180. At step 206, if the SBIOS 176 determines that the "prefer DPGU" flag 182 is set to false, then the method 200 proceeds to step 208. At step 208, the SBIOS 176 selects the MGPU 134 as the boot VGA adapter. At step 210, the SBIOS 176 continues the system boot process. A series of method steps that the SBIOS 176 performs to continue a system boot after selecting the MGPU 134 as the boot VGA adapter is described below in conjunction with FIG. 3.

Referring back now to step 206, if the SBIOS 176 determines that the "prefer DGPU" flag 182 is set to true, then the method 200 proceeds to step 212. At step 212, the SBIOS 176 selects the DGPU 144 as the boot VGA adapter. At step 214, the SBIOS 176 continues the system boot process. A series of method steps that the SBIOS 176 performs to continue a system boot after selecting the DGPU 144 as the boot VGA adapter is described below in conjunction with FIG. 4.

FIG. 3 is a flow diagram of method steps for continuing a system boot after selecting the MGPU 134 as the boot VGA adapter, according to one embodiment of the invention. Although the method steps are described in conjunction with the system for FIG. 1, persons skilled in the art will understand that any system that performs the method steps, in any order, is within the scope of the invention.

As shown, the method 300 begins at step 302, where the SBIOS 176 loads the MGPU VBIOS 178 into the system memory 120 and instructs the MGPU VBIOS 178 to execute a VBIOS POST. Again, as part of the VBIOS POST, the MGPU VBIOS 178 determines the number and capabilities of any display devices that are attached to the MGPU 134. At step 304, the SBIOS 176 reads the value of the "skip display check" flag 184 from the non-volatile BIOS memory 180. At step 306, if the SBIOS 176 determines that the "skip display check" flag 184 is set to true, then the method 300 proceeds to step 312, where the SBIOS 176 completes the system boot as normal, thereby finalizing the selection of the MGPU 134 as the boot VGA adapter If, at step 306, the SBIOS 176 determines that the "skip display check" flag 184 is set to false, then the method 300 proceeds to step 308. At step 308, the SBIOS 176 queries the MGPU VBIOS 178 to obtain a count of display devices that are attached to the MGPU 134. The SBIOS 176 may query the MGPU VBIOS 178 using any technically feasible method, such as a function call. At step 310, if the SBIOS 176 determines that at least one display device 150 is attached to the MGPU 134, then the method 300 proceeds to step 312, where the SBIOS 176 completes the system boot as normal, thereby finalizing the selection of the MGPU 134 as the boot VGA adapter.

If, at step 310, the SBIOS 176 determines that no display devices are attached to the MGPU 134, then the method 300 proceeds to step 314. At step 314, the SBIOS 176 sets the "prefer DGPU" flag 182 to true. At step 316, the SBIOS 176 aborts the current system boot and launches a system reset. As part of the system reset, the computing system 100 is rebooted, and the SBIOS 176 tailors this subsequent system boot process to reflect the "prefer DGPU" flag 182 setting of true and the "skip display check" flag 184 setting of false.

FIG. 4 is a flow diagram of method steps for continuing a system boot after selecting the DGPU 144 as the boot VGA adapter, according to one embodiment of the invention. Although the method steps are described in conjunction with the system for FIG. 1, persons skilled in the art will understand that any system that performs the method steps, in any order, is within the scope of the invention.

As shown, the method 400 begins at step 402, where the SBIOS 176 loads the DGPU VBIOS 148 into the system memory 120 and instructs the DGPU VBIOS 148 to execute a VBIOS POST. Again, as part of the VBIOS POST, the DGPU VBIOS 148 determines the number and capabilities of any display devices that are attached to the DGPU 144. At step 404, the SBIOS 176 reads the value of the "skip display check" flag 184 from the non-volatile BIOS memory 180. At step 406, if the SBIOS 176 determines that the "skip display check" flag 184 is set to true, then the method 400 proceeds to step 414, where the SBIOS 176 completes the system boot as normal, thereby finalizing the selection of the DGPU 144 as the boot VGA adapter.

If, at step 406, the SBIOS 176 determines that the "skip display check" flag 184 is set to false, then the method 400 proceeds to step 408. At step 408, the SBIOS 176 queries the DGPU VBIOS 148 to obtain a count of display devices that are attached to the DGPU 144. The SBIOS 176 may query the DGPU VBIOS 148 using any technically feasible method, such as a function call. At step 410, if the SBIOS 176 determines that at least one display device 150 is attached to the DGPU 144, then the method 400 proceeds to step 412. At step 412, the SBIOS 176 configures the DGPU 144 (via the DGPU VBIOS 148) to display a warning message indicating that, since the DGPU 144 is the boot VGA adapter, certain hybrid functionality is limited. Advantageously, this warning message may alert the user to an unintentional display device attachment error. Again, at step 414, the SBIOS 176 completes the system boot as normal, thereby finalizing the selection of the DGPU 144 as the boot VGA adapter.

If, at step 410, the SBIOS 176 determines that no display devices are attached to the DGPU 144, then the method 400 proceeds to step 416. At step 416, the SBIOS 176 sets the "prefer DGPU" flag 182 to false. At step 418, the SBIOS 176 sets the "skip display check" flag 184 to true. Advantageously, by setting the "skip display check" flag 184 to true, the SBIOS 176 avoids an infinite loop of reboots that might otherwise occur during the system boot process. At step 420, the SBIOS 176 aborts the current system boot and launches a system reset. As part of the system reset, the computing system 100 is rebooted and the SBIOS 176 tailors this subsequent system boot process to reflect the "prefer DGPU" flag 182 setting of false and the "skip display check" flag 184 setting of true.

Figure 5:
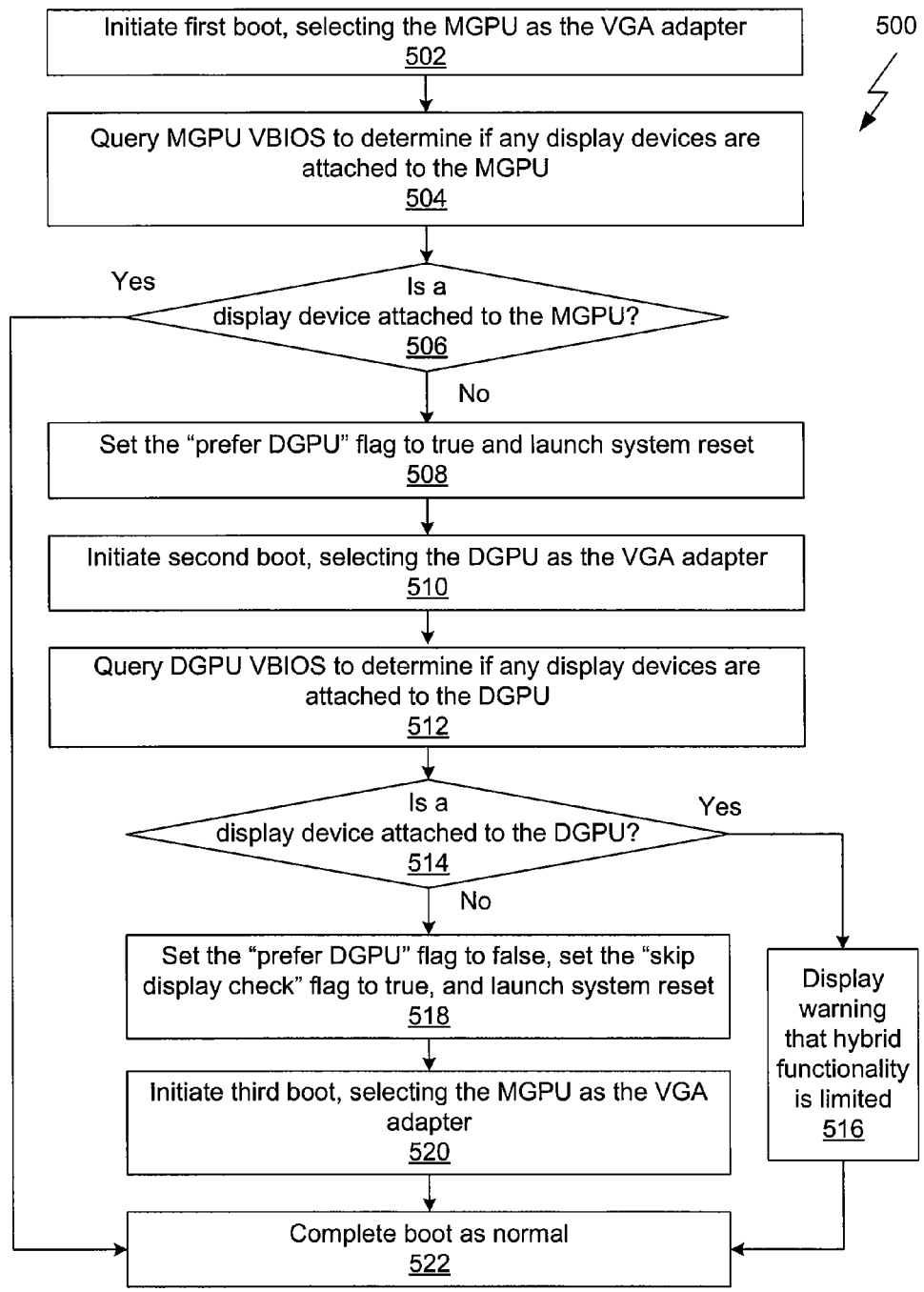
FIG. 5 is a flow diagram of method steps for executing a default system boot, according to one embodiment of the invention.

FIG. 5 is a flow diagram of method steps for executing a default system boot, according to one embodiment of the invention. Although the method steps are described in conjunction with the system for FIG. 1, persons skilled in the art will understand that any system that performs the method steps, in any order, is within the scope of the invention. Initially, both the "prefer DGPU" flag 182 and the "skip display check" flag 184 are set to false.

As shown, the method 500 begins at step 502, where the SBIOS 176 begins a first system boot. As part of the first system boot, the SBIOS 176 selects the MGPU 134 as the boot VGA adapter, loads the MGPU VBIOS 178, and instructs the MGPU VBIOS 178 to execute a VBIOS POST. At step 504, the SBIOS 176 queries the MGPU VBIOS 178 to obtain a count of display devices that are attached to the MGPU 134. The SBIOS 176 may query the MGPU VBIOS 178 using any technically feasible method, such as a function call. At step 506, if the SBIOS 176 determines that at least one display device 150 is attached to the MGPU 134, then the method 500 proceeds to step 522. At step 522, the SBIOS 176 completes the first system boot as normal, thereby finalizing the selection of the MGPU 134 as the boot VGA adapter.

If, at step 506, the SBIOS 176 determines that no display devices are attached to the MGPU 134, then the method 500 proceeds to step 508. At step 508, the SBIOS 176 sets the "prefer DGPU" flag 182 to true, aborts the first system boot, and launches a system reset. At step 510, the system reset causes the SBIOS 176 to initiate a second system boot. As part of the second system boot, the SBIOS 176 selects the DGPU 144 as the boot VGA adapter, loads the DGPU VBIOS 148, and instructs the DGPU VBIOS 148 to execute a VBIOS POST. At step 512, the SBIOS 176 queries the DGPU VBIOS 148 to obtain a count of display devices that are attached to the DGPU 144. The SBIOS 176 may query the DGPU VBIOS 148 using any technically feasible method, such as a function call. At step 514, if the SBIOS 176 determines that at least one display device 150 is attached to the DGPU 144, then the method 500 proceeds to step 516. At step 516, the SBIOS 176 configures the DGPU 144 (via the DGPU VBIOS 148) to display a warning message indicating that, since the DGPU 144 is the boot VGA adapter, certain hybrid functionality is limited. The method 500 then proceeds to step 522. At step 522, the SBIOS 176 completes the second system boot as normal, thereby finalizing the selection of the DGPU 144 as the boot VGA adapter.

If, at step 514, the SBIOS 176 determines that no display devices are attached to the DGPU 144, then the method 500 proceeds to step 518. At step 518, the SBIOS 176 sets the "prefer DGPU" flag 182 to false, sets the "skip display check" flag 184 to true, aborts the second system boot, and launches a second system reset. At step 520, the second system reset causes the SBIOS 176 to initiate a third system boot. As part of the third system boot, the SBIOS 176 selects the MGPU 134 as the boot VGA adapter, loads the MGPU VBIOS 178, and instructs the MGPU VBIOS 178 to execute a VBIOS POST. At step 522, the SBIOS 176 completes the third system boot as normal, thereby finalizing the selection of the MGPU 134 as the boot VGA adapter.

In sum, the selection of the boot VGA adapter is optimized by dynamically controlling the system boot process based on a "prefer DGPU" flag, a "skip display check" flag, and display detection performed during the system boot process. In one embodiment, the "prefer DGPU" flag and the "skip display check" flag are set to false and the SBIOS initiates a first system boot. During the first system boot, the SBIOS launches a MGPU VBIOS POST and, subsequently, queries the MGPU VBIOS to determine the number of display devices attached to the MGPU. If there is a display device attached to the MGPU, then the SBIOS completes this first system boot with the MGPU selected as the boot VGA adapter. Otherwise, the SBIOS sets the "prefer DGPU" flag to true, aborts the first system boot, and launches a system reset. The system reset causes a second system boot during which the SBIOS launches a DGPU VBIOS POST and, subsequently, queries the DGPU VBIOS to determine the number of display devices attached to the DGPU. If there is a display device attached to the DGPU, then the SBIOS completes the second system boot with the DGPU selected as the boot VGA adapter, and displays a warning message indicating that certain hybrid functionality is limited. Otherwise the SBIOS sets the "prefer DGPU" flag and the "skip display check" flag to false, aborts the second system boot and launches another system reset. The system reset causes a third system boot during which the SBIOS launches a MGPU VBIOS POST and, subsequently, completes the third system boot with the MGPU selected as the boot VGA adapter.

Advantageously, if there are any display devices attached to the computing system, then the SBIOS automatically selects a GPU that is attached to a display device as the boot VGA adapter. Consequently, the computing system is able to display data that is targeted only to the boot VGA adapter without any manual intervention from the user. Moreover, the SBIOS secondarily optimizes the hybrid functionality of the computing system by selecting the MGPU to be the boot VGA adapter when both or neither of the GPUs are attached to display devices. Finally, if the SBIOS selects the DGPU as the boot VGA adapter, then the SBIOS displays a warning that indicates that the hybrid functionality is limited, thereby alerting the user to a possible display device attachment error.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for selecting one of a plurality of processing units as a boot VGA adapter, the method comprising:
    initiating a first system boot;
    reading a control flag stored in a non-volatile memory to determine which processing unit should be tested as the boot VGA adapter;
    selecting a first processing unit to query based on the control flag; and
    querying a video basic input/output system (VBIOS) function call associated with the first processing unit to determine whether there are any display devices attached to the first processing unit.

2. The method of claim 1, wherein the first processing unit comprises a graphics processing unit (GPU) integrated within the hardware of a computing device.

3. The method of claim 1, further comprising the step of completing the first system boot if a display device is attached to the first processing unit.

4. The method of claim 1, further comprising the steps of:
    modifying the control flag to specify a second processing unit;
    aborting the first system boot; and
    executing a second system boot,
if no display devices are attached to the first processing unit.

5. The method of claim 4, wherein the second processing unit comprises a GPU that can be coupled to the hardware of a computing device.

6. The method of claim 4, wherein the step of querying the VBIOS associated with the first processing unit is performed in response to a second control flag in the non-volatile memory being set.

7. The method of claim 6, further comprising the steps of:
    clearing the second control flag;
    selecting the second processing unit as the boot VGA adapter based on the modified control flag; and
    completing the second system boot without querying a VBIOS associated with the second processing unit to determine whether there are any display devices attached to the second processing unit.

8. A non-transitory computer-readable medium including instructions that, when executed by a processing unit, cause the processing unit to select one of a plurality of graphics processing units (GPUs) as a boot VGA adapter, by performing the steps of:
    initiating a first system boot;
    reading a control flag stored in a non-volatile memory to determine which GPU should be tested as the boot VGA adapter;
    selecting a first GPU to query based on the control flag; and
    querying a video basic input/output system (VBIOS) associated with the first GPU to determine whether there are any display devices attached to the first GPU.

9. The non-transitory computer-readable medium of claim 8, wherein the first GPU comprises a GPU integrated within the hardware of a computing device.

10. The non-transitory computer-readable medium of claim 8, further comprising the step of completing the first system boot if a display device is attached to the first GPU.

11. The non-transitory computer-readable medium of claim 8, further comprising the steps of:
    modifying the control flag to specify a second GPU;
    aborting the first system boot; and
    executing a second system boot,
if no display devices are attached to the first GPU.

12. The non-transitory computer-readable medium of claim 11, wherein the second GPU comprises a GPU that can be coupled to the hardware of a computing device.

13. The non-transitory computer-readable medium of claim 11, wherein the step of querying the VBIOS associated with the first GPU is performed in response to a second control flag in the non-volatile memory being set.

14. The non-transitory computer-readable medium of claim 13, further comprising the steps of:
    clearing the second control flag;
    selecting the second GPU as the boot VGA adapter based on the modified control flag; and
    completing the second system boot without querying a VBIOS associated with the second GPU to determine whether there are any display devices attached to the second GPU.

15. A computing device configured to select one of a plurality of graphics processing units (GPUs) as a boot VGA adapter, the computing device comprising:
    a processing unit;
    a first GPU coupled to the processing unit;
    a second GPU coupled to the processing unit;
    a non-volatile memory coupled to the processing unit; and
    a system basic input/output system (SBIOS) configured to:
        initiate a first system boot,
        read a control flag stored in the non-volatile memory to determine which GPU should be tested as the boot VGA adapter,
        select the first GPU to query based on the control flag, and
        query a video basic input/output system (VBIOS) function call associated with the first GPU to determine whether there are any display devices attached to the first GPU.

16. The computing device of claim 15, wherein the first GPU comprises a GPU integrated within the hardware of the computing device, and the second GPU comprises a GPU that can be coupled to the hardware of the computing device.

17. The computing device of claim 15, wherein the SBIOS is further configured to complete the first system boot if a display device is attached to the first GPU.

18. The computing device of claim 15, wherein the SBIOS is further configured to:
    modify the control flag to specify the second GPU;
    abort the first system boot; and
    execute a second system boot,
if no display devices are attached to the first GPU.

19. The computing device of claim 18, wherein the SBIOS queries the VBIOS associated with the first GPU in response to a second control flag in the non-volatile memory being set.

20. The computing device of claim 19, wherein the SBIOS is further configured to:

clear the second control flag;

select the second GPU as the boot VGA adapter based on the modified control flag; and complete the second system boot without querying a VBIOS associated with the second GPU to determine whether there are any display devices attached to the second GPU.

* * * * *